US008370758B2

(12) United States Patent
Kii et al.

(10) Patent No.: US 8,370,758 B2
(45) Date of Patent: Feb. 5, 2013

(54) IMAGE BROWSING DEVICE, IMAGE BROWSING METHOD, IMAGE BROWSING PROGRAM, AND IMAGE BROWSING SYSTEM

(75) Inventors: Takahiro Kii, Kawasaki (JP); Hirohisa Naito, Kawasaki (JP); Toru Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 843 days.

(21) Appl. No.: 12/216,247

(22) Filed: Jul. 1, 2008

(65) Prior Publication Data

US 2008/0270922 A1 Oct. 30, 2008

Related U.S. Application Data

(63) Continuation of application No. PCT/JP2006/300831, filed on Jan. 20, 2006.

(51) Int. Cl.
*G06F 3/048* (2006.01)

(52) U.S. Cl. ..................... 715/764; 715/717

(58) Field of Classification Search .......... 715/764, 715/962, 717
See application file for complete search history.

(56) References Cited

U.S. PATENT DOCUMENTS

| 5,655,053 | A * | 8/1997 | Renie .................. 386/278 |
| 8,170,745 | B1 * | 5/2012 | Lors ..................... 701/36 |
| 2003/0044046 | A1 | 3/2003 | Nakamura et al. ...... 382/103 |
| 2003/0086706 | A1 * | 5/2003 | Kinjo .................. 396/420 |
| 2003/0106455 | A1 * | 6/2003 | Weston ................. 104/53 |
| 2005/0052532 | A1 * | 3/2005 | Elooz et al. ........... 348/148 |
| 2007/0033131 | A1 * | 2/2007 | Brett ................... 705/37 |
| 2007/0106484 | A1 * | 5/2007 | Sweatman et al. ...... 702/188 |

FOREIGN PATENT DOCUMENTS

| EP | 0 953 935 | 11/1999 |
| JP | 11-327005 | 11/1999 |
| JP | 2000-67079 | 3/2000 |
| JP | 2001-177750 | 6/2001 |
| JP | 2003-179912 | 6/2003 |
| JP | 2005-286454 | 10/2005 |

(Continued)

OTHER PUBLICATIONS

International Search Report dated Jul. 3, 2006 in corresponding PCT Application No. PCT/JP2006/300831 (12 pages).

(Continued)

*Primary Examiner* — Omar Abdul-Ali
(74) *Attorney, Agent, or Firm* — Staas & Halsey LLP

(57) ABSTRACT

The present invention relates to an image browsing device that, in an amusement park, shoots a user who is riding a ride-on, and makes the user browse the shot image at a place where the user gets off the ride-on. Firstly, when plural users direct their ID cards to the ID readers (11) respectively, users ID, ride-on number, seat numbers are made to correspond to each other to be stored in an image management device (21). When an image photographing device (12) shoots an image including a ride-on (43) and the plural users, the image management device (21) stores the image shot by the image photographing device (12), and relates the ride-on number, users ID, seat numbers to the image to store thus related information as image information. When the user browses the image, the user sets the ID card close to radio communication units (52), and, in the previously shot image, the image of a seat position related to the ID card is highlighted to be displayed. Accordingly, it becomes possible to easily specify the user who is shot in the previously shot image.

19 Claims, 9 Drawing Sheets
(4 of 9 Drawing Sheet(s) Filed in Color)

FOREIGN PATENT DOCUMENTS

JP      2006-1715      1/2006

OTHER PUBLICATIONS

International Preliminary Report on Patentability, mailed Jul. 22, 2008, in corresponding International Application No. PCT/JP2006/300831 (5 pp.).

Kenya Suzuki et al., "Zoom Interface System to Retrieve Book-Type Contents in Digital Library", Proceedings of the $61^{st}$ National Convention of IPSJ (latter term of the $12^{th}$ year of the Heisei era) (3), Database and Media Network, Japan, Information Processing Society of Japan, Oct. 3, 2000, pp. 3-131 and 3-132.

Japanese Office Action issued Sep. 28, 2010 in corresponding Japanese Patent Application 2007-554787.

* cited by examiner

FIG.5

| IMAGE NUMBER | RIDE-ON NUMBER | SEAT NUMBER | USER ID | GROUP ID | PURCHASE SPECIFICATION |
|---|---|---|---|---|---|
| P-0001 | 100 | A-1 | U-0001 | G-0001 | PAPER ENTIRETY |
| P-0001 | 100 | B-2 | U-0002 | G-0001 | DIGITAL ENLARGEMENT |
| ... | ... | ... | ... | ... | ... |

IMAGE BROWSING DEVICE, IMAGE BROWSING METHOD, IMAGE BROWSING PROGRAM, AND IMAGE BROWSING SYSTEM

TECHNICAL FIELD

This application is a continuation of PCT Application No. PCT/JP2006/300831, filed Jan. 20, 2006, the disclosure of which is incorporated in its entirety by reference. The present invention relates to an image browsing device, an image browsing method, an image browsing program, and an image browsing system which make a user browse a shot image.

BACKGROUND ART

In recent years, in an amusement park and a theme park, there is performed a service of shooting a user who is riding a ride-on, and selling thus photographs of the user shot on the spot. A plurality of shot images are disposed at a place where the user gets off the ride-on, and the user confirms images in which the user is shot from among the plural images, and purchases photographs the images of which are printed out.

As a conventional technology according to the present invention, there is known an image photographing device for a theme park (For example, refer to Patent Document 1). Under this technology, an ID card for identification is distributed to a user, and images which are shot by a plurality of cameras arranged in a theme park are stored together with the ID, and an album is formed by retrieving images using the ID.
Patent Document 1: Jpn. Pat. Appln. Laid-Open Publication No. 2001-177750

DISCLOSURE OF THE INVENTION

Problems to be Solved by the Invention

However, in the above-described service, images are shot by each ride-on, and merely plural shot images are disposed to be displayed. Accordingly, since the user has to find out images in which the user is shot from among the images in which many peoples are shot, it is not easy to find out images in which the user is shot. Furthermore, due to the image of the entire ride-on, the resolution of part of the image in which the user is shot is low. Furthermore, since photographs are expensive, there is a problem, that is, the probability that photographs are purchased is low. Moreover, under the technology of the Patent Document 1, images shot at a plurality of places are collectively browsed to be purchased, and it is impossible to immediately confirm and purchase the images after the images are shot.

The present invention solves the above-described problems, and it is an object of the present invention to provide an image browsing device, an image browsing method, an image browsing program, and an image browsing system which make it easy to specify an individual who is shot in an image.

Means for Solving the Problems

According to the present invention, there is provided an image browsing device that makes a user browse an image, including: a radio communication unit that performs radio communication with a closely arranged radio communication tag; and a display unit that displays a previously shot first image, and highlights a position which is previously related to the radio communication tag in the first image.

In the image browsing device according to the present invention, the radio communication unit is arranged by a plural number, and the plural radio communication units can communicate with different radio communication tags respectively, and the display unit performs the highlight display using different expression methods for the respective radio communication units.

In the image browsing device according to the present invention, the display unit displays a second image corresponding to the position related to the radio communication tag.

In the image browsing device according to the present invention, the display unit generates a second image by enlarging the position related to the radio communication tag in the first image, and displays the second image.

In the image browsing device according to the present invention, the display unit displays the second image corresponding to the position of the radio communication unit.

In the image browsing device according to the present invention, the first image is an image in which a plurality of seats including a seat of the user are shot, the second image is narrower than the first image, in which a range including the seat of the user is shot, and the position which is previously related to the radio communication tag is the seat of the user.

In the image browsing device according to the present invention, the radio communication unit is arranged by a plural number, and the plural radio communication units are allocated to radio communication units that perform instruction of displaying an image and radio communication units that perform instruction of purchasing an image.

In the image browsing device according to the present invention, the device further includes a settlement instruction unit that performs instruction of settlement to purchase an image.

In the image browsing device according to the present invention, the device further includes an image output unit that outputs an image to the outside.

The different expression methods according to the present invention are characterized in that different colors are used.

According to the present invention, there is also provided an image browsing method that makes a user browse an image using an image browsing device, including: a shooting step that shoots a first image, and relates the first image, a position of the shooting subject, and a radio communication tag to each other; a radio communication step that, in the image browsing device, performs radio communication with the closely arranged radio communication tag; and a display step that, in the image browsing device, displays the first image that is shot in the shooting step, and highlights the position related to the radio communication tag in the shooting step in the first image.

In the image browsing method according to the present invention, the radio communication step can, by using a plurality of radio communication units arranged in the image browsing device, communicate with different radio communication tags for the respective radio communication units, and the display step performs the highlight display using different expression methods for the respective radio communication units.

In the image browsing method according to the present invention, the display step displays a second image corresponding to the position related to the radio communication tag.

In the image browsing method according to the present invention, the display step generates a second image by enlarging the position related to the radio communication tag in the first image, and displays the second image.

In the image browsing method according to the present invention, the first image is an image in which a plurality of seats including a seat of the user are shot, the second image is narrower than the first image, in which a range including the seat of the user is shot, and the position which is previously related to the radio communication tag is the seat of the user.

In the image browsing method according to the present invention, the method further includes a settlement step that performs a settlement to purchase an image after the display step.

In the image browsing method according to the present invention, the method further includes an image output step that outputs an image to the outside after the settlement step.

According to the present invention, there is also provided a recording medium that records a computer-readable browsing program in order to allow a computer to execute a method of an image browsing, the image browsing program allows a computer to execute the steps including: a radio communication step that performs radio communication with a closely arranged radio communication tag; and a display step that displays a previously shot first image, and highlights a position which is previously related to the radio communication tag in the first image.

According to the present invention, there is also provided an image browsing system that makes a user browse an image using an image browsing device, including: an image management unit that relates a first image, a position of the subject of the first image, and a radio communication tag to each other; a radio communication unit that performs radio communication with the closely arranged radio communication tag; and a display unit that displays the first image, for which the relating is performed by the image management unit, and highlights the position related to the radio communication tag in the first image.

In the image browsing system according to the present invention, the system further includes a settlement unit that performs a settlement to purchase an image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 shows a table indicative of an example of image information according to the present embodiment;

BEST MODE FOR CARRYING OUT THE INVENTION

An embodiment of the present invention will further be described below with reference to the accompanying drawings.

Firstly, the configuration of an image browsing system according to the present embodiment will be explained.

Figure 1:
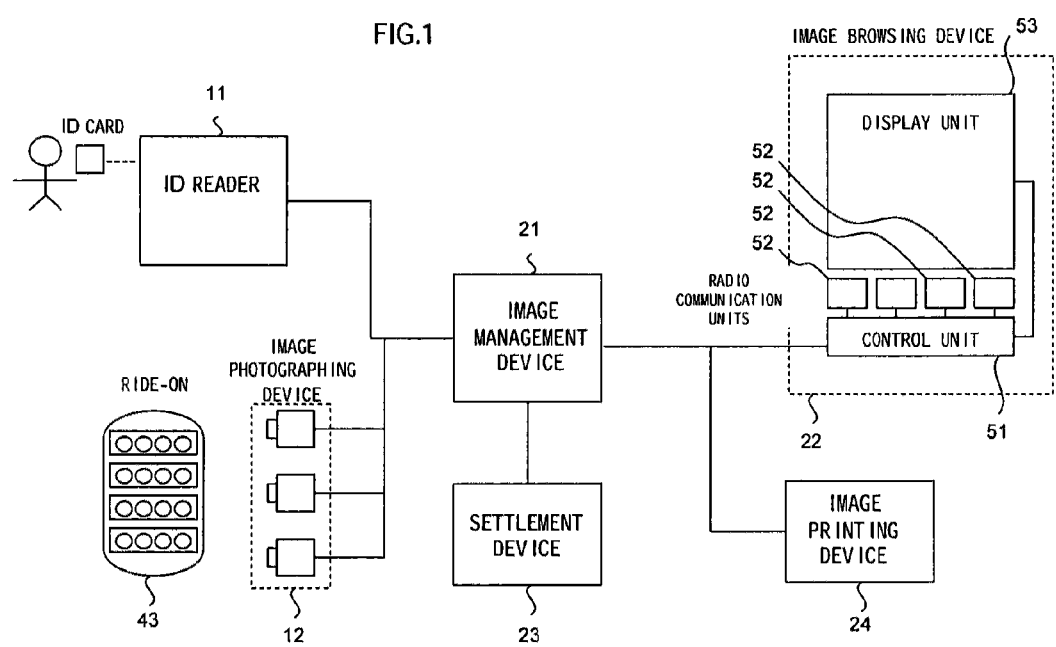
FIG. 1 shows a block diagram indicative of an example of the configuration of an image browsing system according to the present embodiment.

FIG. 1 shows a block diagram indicative of an example of the configuration of the image browsing system according to the present embodiment. The image browsing system includes an ID reader 11, an image photographing device 12, an image management device 21, an image browsing device 22, a settlement device 23, and an image printing device 24.

ID cards having unique user ID respectively are previously distributed to users. The ID card is a radio communication tag. The radio communication tag is, for example, a contactless IC card or a cellular phone having a contactless IC card mounted thereto. In case users belong to a group, a group ID is previously set to ID cards of the users belonging to the same group.

The ID reader 11 has a function of a reader of a radio communication tag. Furthermore, a ride-on 43 which the user rides starts from a gate where the ID reader 11 is arranged, and passes through the shooting range of the image photographing device 12, and reaches a drop-off where the image browsing device 22 is arranged.

The image browsing device 22 includes a control unit 51, a plurality of radio communication units 52, and a display unit 53. The lower end of the display unit 53 is in contact with the plural radio communication units 52. The display unit 53 is, for example, a touch panel which is provided with a function of accepting an input from the user.

Figure 2:
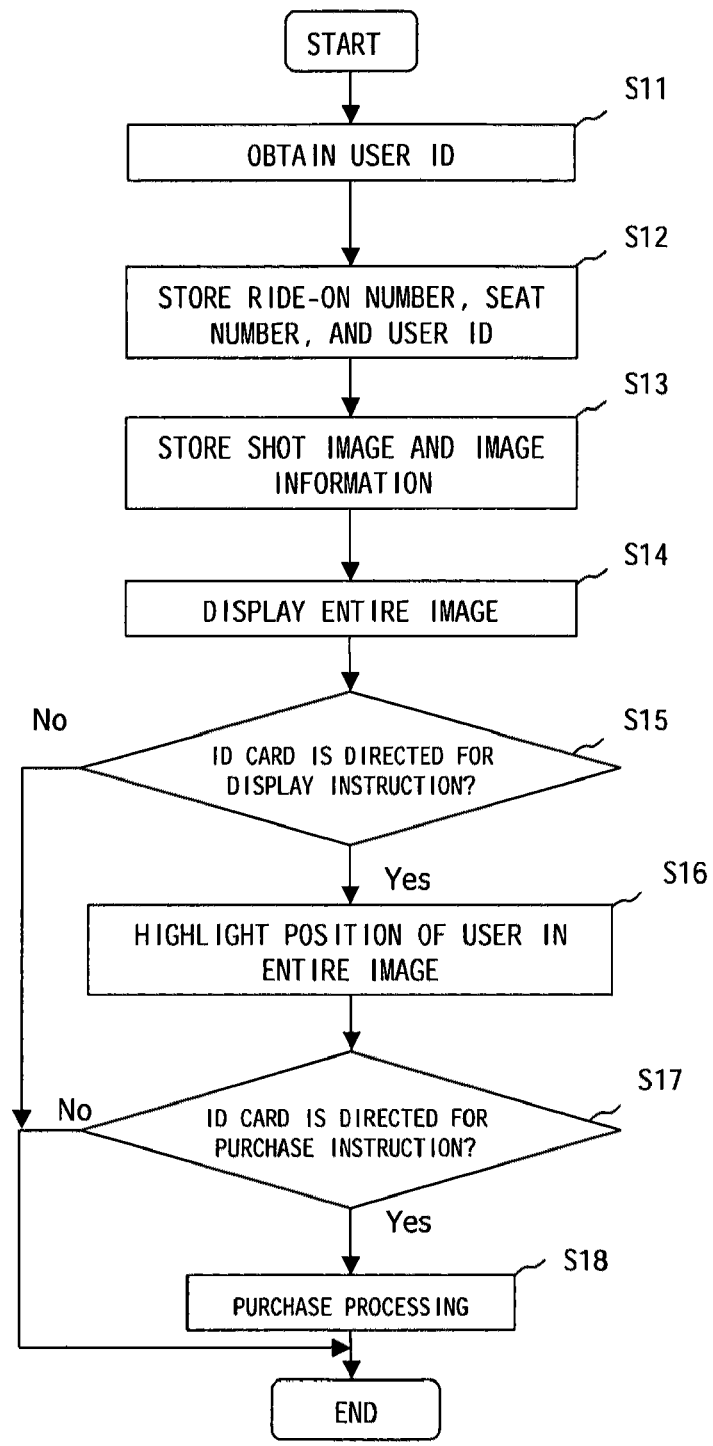
FIG. 2 shows a flow chart indicative of an example of the operation of the image browsing system according to the present embodiment.
Figure 3:
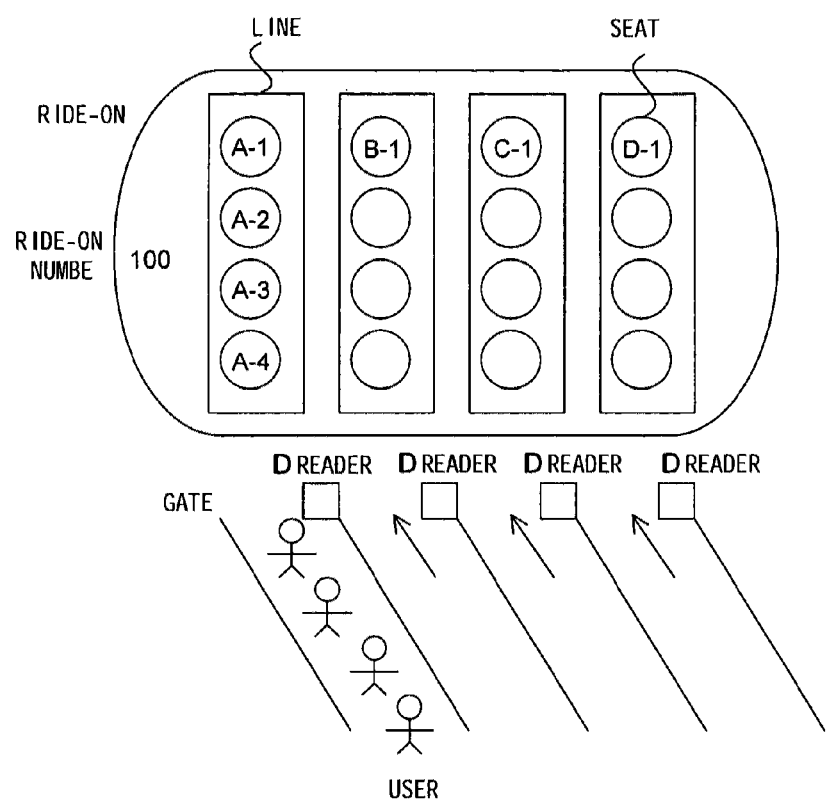
FIG. 3 shows a view indicative of an example of the arrangement of ID readers according to the present embodiment.

Next, the operation of the image browsing system according to the present embodiment will be explained. FIG. 2 shows a flow chart indicative of an example of the operation of the image browsing system according to the present embodiment. Firstly, when the user directs the ID card to the ID reader 11, the ID reader 11 obtains the user ID included in the ID card (S11). FIG. 3 shows a view indicative of an example of the arrangement of the ID readers 11 according to the present embodiment. The ID readers 11 are arranged at a gate of the ride-on. When the ride-on has plural lines of seats, the ID readers 11 are arranged at entrances for the respective lines. Furthermore, when the user gets on the ride-on from the entrance, the user has to direct the ID card to the ID reader 11. In the present embodiment, the ride-on has four lines of seats in the backward and forward direction, and each line has four seats. Furthermore, so as to correctly figure out the seat position of the user, the ID readers 11 for the seats (4 seats) may be arranged for the respective lines of the gate, or the ID readers 11 may be arranged for the respective seats of the ride-on.

Next, the image management device 21 makes the user ID which is obtained by the ID reader 11 correspond to the ride-on number and seat number, and stores the user ID (S12). When the user gets on the ride-on, by specifying the ride-on number, specifying the ID reader 11 which obtains the user ID, and specifying order in which the user ID is obtained by the ID reader 11, the image management device 21 obtains the ride-on number and seat number of the user.

Next, when the ride-on passes through the shooting range of the image photographing device 12, and the image photographing device 12 shoots an image including the ride-on 43 and user, the image management device 21 stores the image shot by the image photographing device 12, and makes the ride-on number, user ID of the user who rides the ride-on, and seat number correspond to the image to store them as image information (S13).

Figure 4:
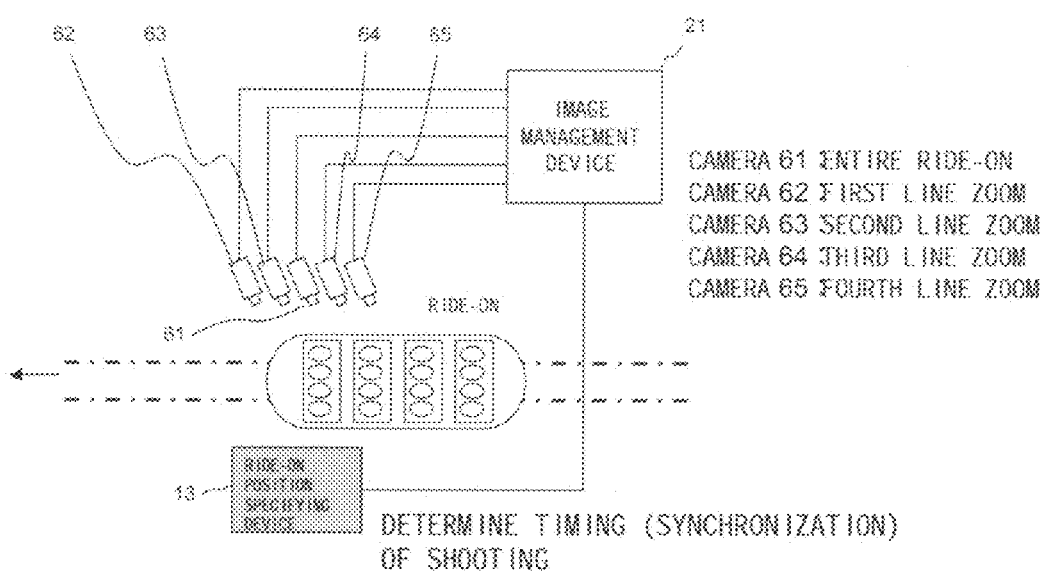
FIG. 4 shows a view indicative of an example of the arrangement of an image photographing device according to the present embodiment.

Next, the shooting will be explained. FIG. 4 shows a view indicative of an example of the arrangement of the image photographing device according to the present embodiment. In this embodiment, the image photographing device 12 includes a single camera 61 which shoots the entire ride-on, and four cameras 62, 63, 64, 65 which shoot an enlarged image which is larger than that shot by the camera 61. The cameras 62, 63, 64, 65 shoot seats of different lines, respectively. The image management device 21 detects the timing at which the ride-on passes through the shooting range of the image photographing device 12 using a ride-on position specifying device 13, and performs an instruction of shooting to the image photographing device 12.

On the other hand, instead of using the cameras 62, 63, 64, 65, the image management device 21 may enlarge an image of the entire ride-on which is shot by the camera 61, and generate images in which the respective lines are enlarged. At this time, it is assumed that the image of the entire ride-on which is shot by the camera 61 has a sufficient resolution for enlarging the image. The shot image may be a still image or a moving image. In case the image is a moving image, by making the respective cameras perform shifting such as swinging, the respective cameras may be made to shift in accordance with the ride-on.

Next, image information will be explained. FIG. 5 shows a table indicative of an example of image information according to the present embodiment. The image information has entries for the respective images, and, as items, has the image number, ride-on number, seat number, user ID, group ID, and purchase specification. The image number is allocated at the time of the shooting. The ride-on number, seat number, user ID, group ID are obtained at the time of getting on the ride-on. The purchase specification is obtained in image purchase processing to be described later.

Figure 6:
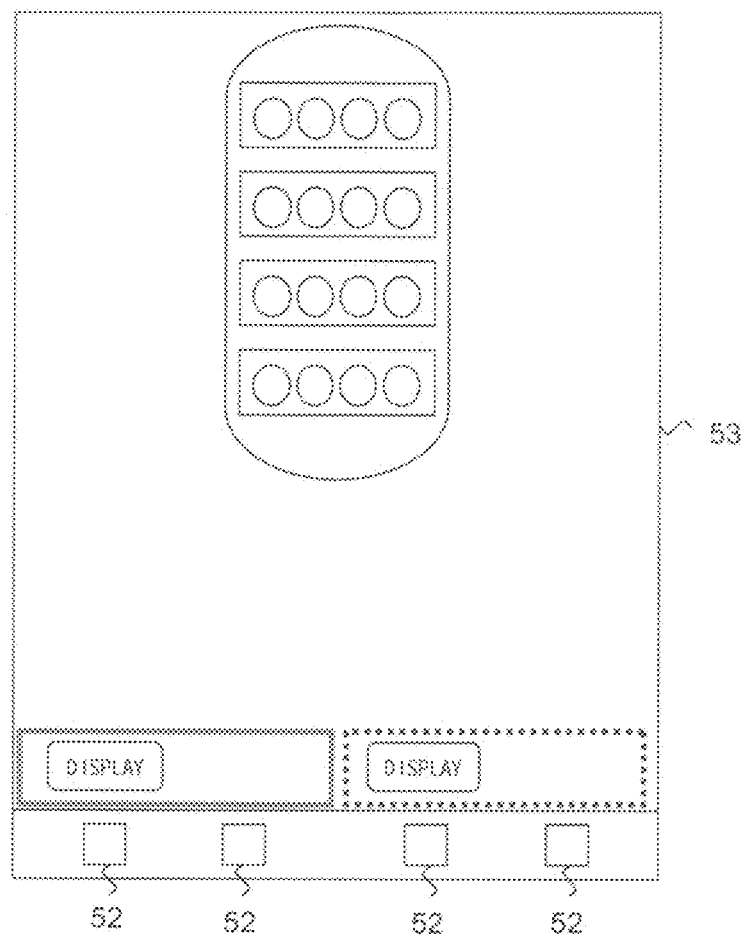
FIG. 6 shows a screen indicative of an example of the display of the entire image according to the present embodiment.

Next, of thus shot images, the control unit 51 of the image browsing device 22 obtains the entire image and its image information from the image management device 21, and displays thus obtained image on the upper part of the display unit 53 (S14). FIG. 6 shows a screen indicative of an example of the display of the entire image according to the present embodiment. The control unit 51 displays characters of "Display" on the lowermost end of the display unit 53, which is part in contact with the radio communication units 52 used for the display instruction. Furthermore, for the characters of "Display", unique expression methods are allocated for the respective corresponding radio communication units 52. The expression methods are, for example, expressing with different colors, enclosing with different lines, etc. In the example shown in FIG. 6, two radio communication units 52 are separately displayed using a solid line and a dotted line. Furthermore, according to the timing at which the user reaches the image browsing (management?) device 21, an image in which the entire ride-on corresponding to the user ID is shot is displayed as the entire image. On the other hand, as the entire image, an entire image in which entire plural ride-ons are shot may be displayed.

Next, the control unit 51 determines whether or not the ID card is directed to the radio communication units 52 for the display instruction by the user within a predetermined period (S15). In case the ID card is not directed thereto within a predetermined period (S15, N), this flow is ended. On the other hand, in case the ID card is directed thereto within a predetermined period (S15, Y), the control unit 51 obtains the user ID of the ID card using the radio communication units 52, obtains image information which has the user ID, highlights a seat specified based on the image information in the image of the entire ride-on displayed on the upper part of the display unit 53, obtains a seat image of a seat specified based on the image information to display it on the lower part of the display unit 53 (S16). The entire image and seat image may be different images, or the seat image may be generated by enlarging the position of a seat corresponding to the user ID in the entire image. In case a group ID is set in addition to the user ID, the control unit 51 obtains image information which has the group ID and image, and displays the image.

Figure 7:
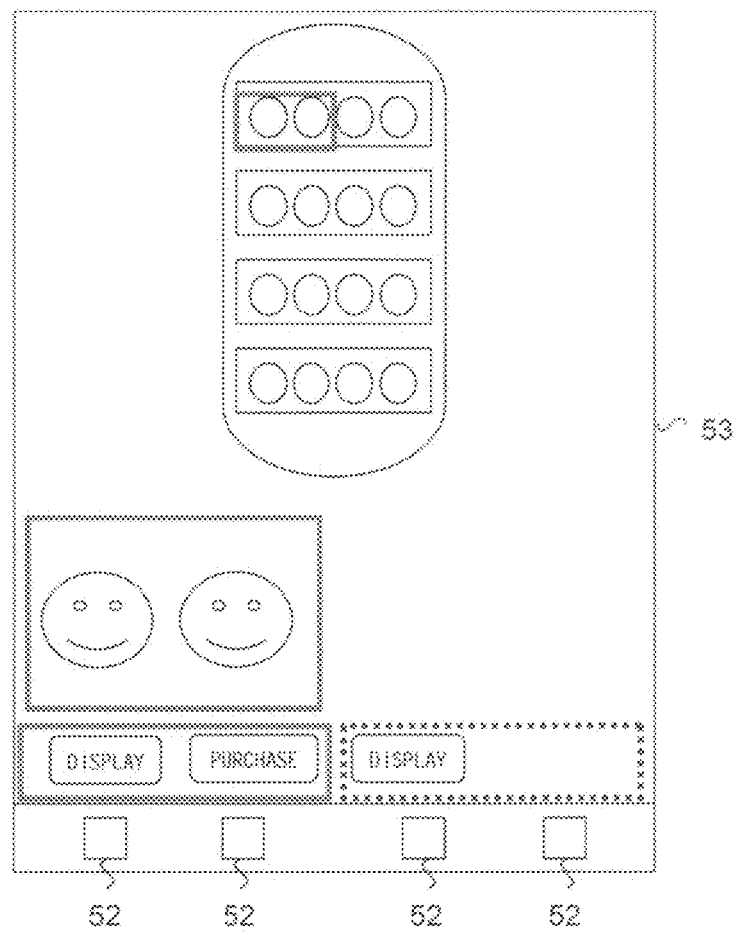
FIG. 7 shows a screen indicative of an example of the highlight display according to the present embodiment.

FIG. 7 shows a screen indicative of an example of the highlight display according to the present embodiment. As compared with FIG. 6, the position of the user in the entire image on the upper part is highlighted, the seat image in which the user is enlarged is added on the lower part, and the display indicative of the radio communication units 52 for the purchase instruction is added on the lowermost end. Furthermore, the seat image is displayed on the position in contact with the radio communication units 52 to which the ID card is directed. For these highlight display, seat image, display for the purchase instruction, similar to FIG. 6, expression methods (color, line, etc.) allocated to the radio communication units 52 to which the ID card is directed are used.

Figure 8:
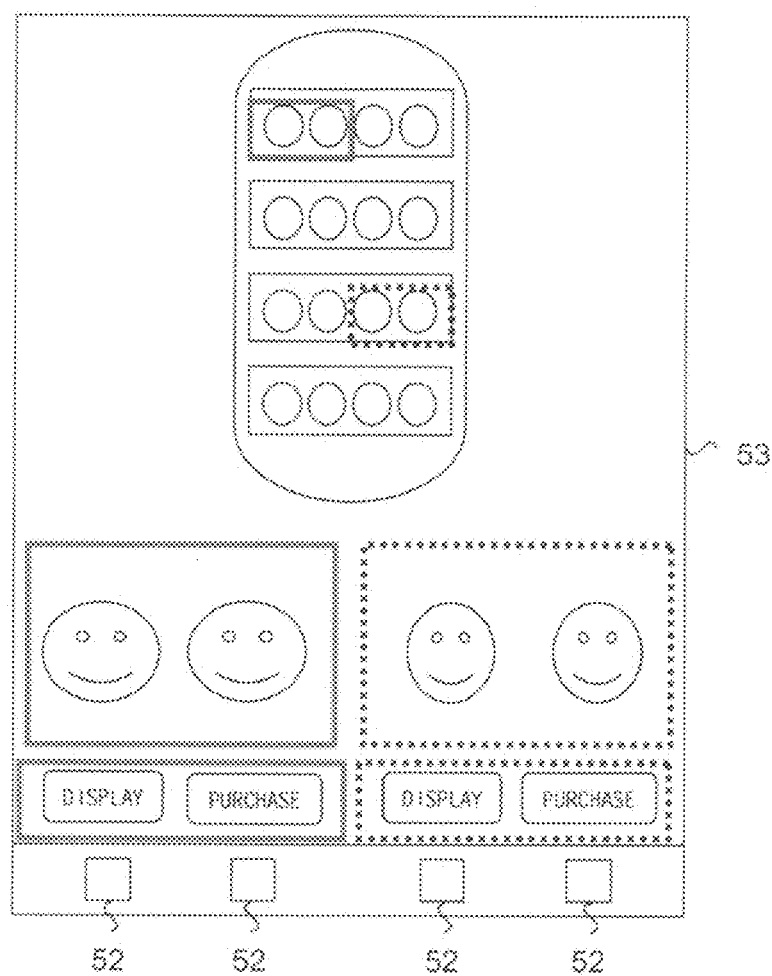
FIG. 8 shows a screen indicative of an example of an image of the highlight display for plural users according to the present embodiment.

Furthermore, when different ID cards are directed to the plural predetermined radio communication units 52, corresponding seats are highlighted using colors corresponding to the radio communication units 52. For these highlight display, seat image, display for the purchase instruction, similar to FIG. 6 and FIG. 7, expression methods (color, line, etc.) allocated to the radio communication units 52 to which the ID cards are directed are used. FIG. 8 shows a screen indicative of an example of an image of the highlight display for the plural users according to the present embodiment. In FIG. 8, the image is separately displayed using a solid line and a dotted line. Other methods may be used for the method of the highlight display so long as the users can be distinguished. As compared with FIG. 7, another highlight display is added in the entire image on the upper part, a seat image in which another user is enlarged is added on the lower part, and characters of "Purchase" indicative of the position of the radio communication units 52 for the purchase instruction are added on the lowermost end for the user.

Next, the control unit 51 determines whether or not the ID card is directed to the predetermined radio communication units 52 for the purchase instruction by the user within a predetermined period (S17). In case the ID card is not directed thereto within a predetermined period (S17, N), this flow is ended. On the other hand, in case the ID card is directed thereto within a predetermined period (S17, Y), image purchase processing with respect to an image displayed on the display unit 53 is performed (S18), and this flow is ended.

According to the operation of the above-described image browsing system, by automatically identifying the user, and displaying a corresponding image, the user can easily find out photographs in which the user is shot. Furthermore, the image in which the user is shot has a sufficient resolution. Furthermore, since a plurality of users can concurrently access the image browsing system using the plural radio communication units 52, and displaying is separately performed by colors for the respective users, even if a single display is shared, mix-up with other users can be prevented.

Next, the operation of the image purchase processing in the image browsing system will be explained.

Figure 9:
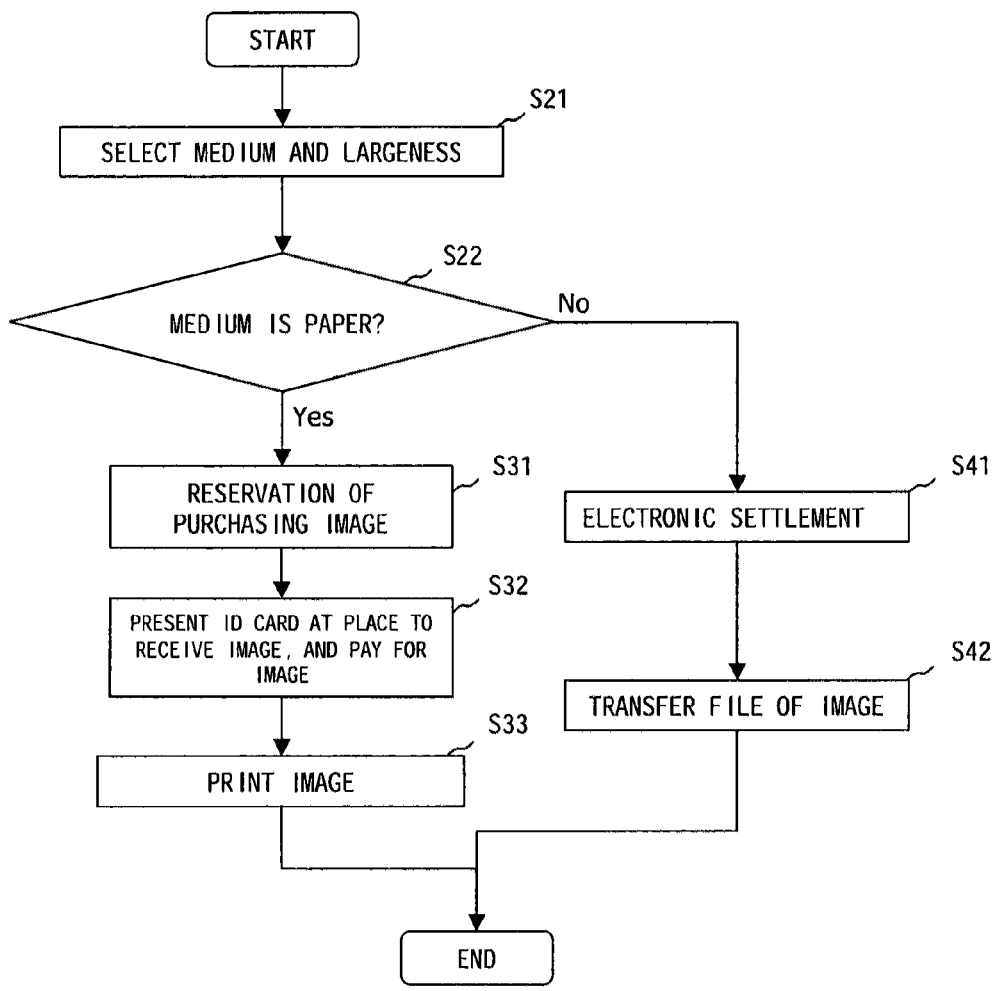
FIG. 9 shows a flow chart indicative of an example of the operation of the image purchase processing according to the present embodiment.

FIG. 9 shows a flow chart indicative of an example of the operation of the image purchase processing according to the present embodiment. Firstly, the control unit 51 makes the display unit 53 display selection information of the medium and largeness of an image to be purchased, and accepts the operation of selection by the user (S21). Information selected by the user is recorded in the image management device 21 as purchase specification of image information. Furthermore, according to the selected largeness, the control unit 51 enlarges and reduces the image. In case the image is a moving image, a still image may be selected from the moving image. Furthermore, an image to be purchased may be the entire image or seat image. Next, the control unit 51 determines whether or not the selected medium is a paper (S22).

In case the medium is a paper (S22, Y), the control unit 51 makes the display unit 53 display information of reservation of purchasing an image, and accepts the operation of reservation by the user (S31). Next, when the user presents the ID card at a place to receive an image, and pays for the image (S32), the control unit 51 makes the image printing device 24 print an image to be purchased (S33), and the user receives a printed image, and this flow is ended.

On the other hand, in case the medium is not a paper but a file (S22, Y), the control unit 51 makes the display unit 53 display information of the electronic settlement for the expense of the image, accepts the operation of settlement instruction by the user, and performs the electronic settlement using the settlement device 23 (S41). When the electronic settlement is completed, the control unit 51 outputs a file of the purchased image to a cellular phone, memory, etc. of the user (S42), and this flow is ended. So as to output a file of the image to the outside, the image browsing device 22 may be provided with a function of performing the radio communication with a cellular phone or the infrared communication with a cellular phone, and may have a memory slot to write data to a memory.

On the other hand, in case the medium is a paper, while the user pays for the image at a place to receive an image, similar to the case in which the medium is a file, the electronic settlement may be performed.

In the above-described image purchase processing, the purchase intention can be confirmed and the settlement can be performed on the spot, which prevents the user from forgetting to purchase an image, and prompts the user to purchase an image. Furthermore, when a contactless IC card is used as a radio communication tag, the electronic settlement using an existing cellular phone having a contactless IC card mounted thereto can be performed, which improves the convenience for the user.

While the image browsing system in this embodiment deals with images which are shot when the user rides a ride-on, the image browsing system may deal with images which are shot at shooting spots other than a ride-on or at places where characters exist.

Furthermore, the image browsing device according to the present embodiment can be easily applied to an information processing device, and can further improve the performance of the information processing device. The information processing device may be a personal computer, a server, etc.

Furthermore, a program that makes a computer configuring the image browsing device execute the above-described respective steps may be provided as an image browsing program. When stored in a computer-readable recording medium, the above-described program can be executed by a computer configuring the image browsing device. The computer-readable recording medium may be an internal storage device such as a ROM, a RAM, etc. which is mounted to the inside of a computer, a portable storage medium such as a CD-ROM, a flexible disk, a DVD disk, a magneto optical disk, an IC card, etc., a database retaining a computer program, or, other computers and their databases, furthermore, a transmission medium on a line.

On the other hand, the display unit corresponds to the control unit and display unit in this embodiment. The settlement instruction unit and image output unit correspond to the control unit in this embodiment. The shooting step corresponds to the processing of the ID reader, image photographing device, image management device in this embodiment. The settlement step corresponds to the processing of the settlement device in this embodiment. The image output step corresponds to the processing of the control unit or image printing device in this embodiment. The settlement unit corresponds to the settlement device in this embodiment.

INDUSTRIAL APPLICABILITY

As described above, according to the present invention, an individual shot in an image can be easily specified.

The invention claimed is:

1. An image browsing method comprising:
    specifying a seat number indicating a seat among a plurality of seats of a vehicle from a plurality of vehicles according to a user ID acquired, where a radio communication tag stores the user ID, the user riding on the seat when the user ID of the user is acquired from a radio communication tag of the user by a first radio communication with the radio communication tag;
    associating and storing the user ID with a first image taken, a vehicle number and the seat number, the first image being taken to be within a first range including a predetermined plurality of seats in the vehicle;
    performing a second radio communication with the radio communication tag first image is taken and the user has exited the vehicle;
    displaying the first image; and
    acquiring a position associated with the seat number in the first image by associating the user ID, the vehicle number and the seat number of the first radio communication with the user ID of the second radio communication, and highlighting the position in the displayed first image.

2. The image browsing method according to claim 1, wherein
    a plurality of radio communication units configured to communicate with a plurality of radio communication tags respectively, are included, and
    said displaying performs highlight display using different expression methods for the respective radio communication units.

3. The image browsing method according to claim 1, comprising:
    acquiring a second image associated with the user ID acquired by the second radio communication; and
    displaying the second image.

4. The image browsing method according to claim 3, comprising:
    generating the second image by enlarging the position in the first image.

5. The image browsing method according to claim 3, wherein
    the second image indicates a second range, and
    the second range is narrower than the first range and includes the seat.

6. The image browsing method according to claim 1, comprising:
performing a settlement to purchase the first image after said displaying of the first image.

7. The image browsing method according to claim 6, comprising:
outputting the first image after said performing.

8. A non-transitory computer-readable medium that includes a program to allow a computer to execute a process, the process comprising:
specifying a seat number indicating a seat among a plurality of seats of a vehicle from a plurality of vehicles according to an acquired user ID, where a radio communication tag stores the user ID indicating the user, the user riding on the seat when the user ID of the user is acquired from a radio communication tag of the user by a first radio communication with the radio communication tag;
associating and storing the user ID with a first image taken, a vehicle number and the seat number;
performing a second radio communication with the radio communication tag to acquire the user ID after the first image is taken, where the first image is taken to be within a first range including a predetermined plurality of seats in the vehicle, and the user has exited the vehicle;
displaying the first image; and
acquiring a position associated with the seat number in the first image by associating the user ID, the vehicle number and the seat number of the first radio communication with the user ID of the second radio communication, and highlighting the position in the displayed first image.

9. An image browsing system comprising:
an image management unit that when a first radio communication unit acquires a user ID of a user from a radio communication tag of the user by a first radio communication with the radio communication tag, specifies a seat number indicating a seat of a plurality of seats of a vehicle from a plurality of vehicles according to the acquiring of the user ID and associates the user ID with the seat number, where the radio communication tag stores the user ID of the user riding on the seat;
a second radio communication unit that performs a second radio communication with the radio communication tag by a second radio communication unit after a first image is taken where the first image is taken within a first range including a predetermined plurality of seats in the vehicle; and
a display unit that displays the first image, wherein
the image management unit associates and stores the first image taken, the user ID, a vehicle number and the seat number, and
the second radio communication unit acquires the user ID by the second radio communication after the first image is taken and the user exits the vehicle, and
the display unit displays the first image taken, associating the user ID, the vehicle number and the seat number of the first radio communication with the user ID acquired by the second radio communication, and acquires a position which is associated with the seat number in the first image, highlighting the acquired position.

10. The image browsing system according to claim 9, wherein the second radio communication unit includes a plurality of radio communication units configured to communicate with different radio communication tags respectively, and the display unit performs highlight display using different expression methods for the respective radio communication units.

11. The image browsing system according to claim 9, wherein
the display unit acquires a second image associated with the user ID acquired by the second radio communication and displays the second image.

12. The image browsing system according to claim 11, wherein
the display unit generates the second image by enlarging a position in the first image.

13. The image browsing system according to claim 11, wherein
the display unit displays the second image according to a position of the second radio communication unit when the second radio communication unit acquires the user ID.

14. The image browsing system according to claim 11, wherein
the second image indicates a second range, and
the second range is narrower than the first range.

15. The image browsing system according to claim 9, wherein
the second radio communication unit includes a plurality of radio communication units, and
the plurality of radio communication units include a radio communication unit that performs an instruction of displaying the first image, and include a radio communication unit that performs an instruction of purchasing the first image.

16. The image browsing system according to claim 9, comprising:
a settlement instruction unit that performs an instruction of a settlement to purchase the first image after the display unit displays the first image.

17. The image browsing system according to claim 9, comprising:
an image output unit that outputs the first image after the settlement instruction unit performs the instruction of the settlement.

18. The image browsing system according to claim 2, wherein
the different expression methods are different colors.

19. The image browsing device according to claim 9, wherein
the image management unit specifies the vehicle number and the seat number by determining an order of acquisition of the user ID and associates the user ID, the vehicle number and the seat number.

* * * * *

UNITED STATES PATENT AND TRADEMARK OFFICE
CERTIFICATE OF CORRECTION

PATENT NO. : 8,370,758 B2
APPLICATION NO. : 12/216247
DATED : February 5, 2013
INVENTOR(S) : Takahiro Kii et al.

It is certified that error appears in the above-identified patent and that said Letters Patent is hereby corrected as shown below:

Column 1 of the Specification, delete "TECHNICAL FIELD" and insert -- CROSS-REFERENCE TO RELATED APPLICATION --, therefor.
Column 1 of the Specification, insert -- TECHNICAL FIELD -- as the title before the sentence "The present invention relates to an image browsing device, an image browsing method, an image browsing program, and an image browsing system which makes a user browse a shot image.".

In the Claims
Column 8, Line 38, In Claim 1, after "tag" insert -- after said --.
Column 10, Line 48, In Claim 18, delete "claim 2," and insert -- claim 10, --, therefor.
Column 10, Line 51, In Claim 19, delete "device" and insert -- system --, therefor.

Signed and Sealed this
Fourth Day of June, 2013

Teresa Stanek Rea
*Acting Director of the United States Patent and Trademark Office*